United States Patent [19]
Finley et al.

[11] Patent Number: 5,799,509
[45] Date of Patent: Sep. 1, 1998

[54] MULTI-COMPONENT RECOVERY APPARATUS AND METHOD

[75] Inventors: Steven J. Finley, Wayne; Piotr J. Sadkowski, Bridgewater; Atul M. Athalye, Chatham, all of N.J.

[73] Assignee: The BOC Group, Inc., New Providence, N.J.

[21] Appl. No.: 916,454

[22] Filed: Aug. 22, 1997

[51] Int. Cl.⁶ .................................................. F25J 1/00
[52] U.S. Cl. ........................... 62/638; 62/641; 62/909
[58] Field of Search ..................... 62/638, 641, 55.5, 62/909

[56] References Cited

U.S. PATENT DOCUMENTS

| | | | |
|---|---|---|---|
| 5,345,771 | 9/1994 | Dinsmore | 62/641 |
| 5,398,513 | 3/1995 | Klobucar | 62/641 |
| 5,533,338 | 7/1996 | Lee et al. | 62/638 |

*Primary Examiner*—Ronald C. Capossela
*Attorney, Agent, or Firm*—David M. Rosenblum; Salvatore P. Pace

[57] ABSTRACT

An apparatus and method for recovering one or more components from the vapor feed in which the component is recovered from the vapor feed at a lower pressure within a lower pressure cold trap. Thereafter, a higher pressure cold trap is connected to the lower pressure cold trap and the component revaporizes in the lower pressure cold trap and resolidifies in the higher pressure cold trap. The higher pressure cold trap is then isolated and the component is allowed to thaw to build up a vapor pressure such that the component can be delivered for recovery at a high pressure. Two or more components having higher and lower boiling points can be recovered by low pressure cold traps set in series. Low pressure cold traps can be provided to operate in an out of phase relationship so that components are frozen on one set of lower pressure cold traps while being vaporized from the other set of cold traps. In the case of two component recovery, two high pressure cold traps are provided to allow two components to vaporize and thus develop a sufficient vapor pressure to be delivered at the requisite delivery pressure.

8 Claims, 1 Drawing Sheet

MULTI-COMPONENT RECOVERY APPARATUS AND METHOD

BACKGROUND OF THE INVENTION

The present invention relates to an apparatus and method for recovering one or more components from a vapor feed in which the vapor feed is passed through cold traps in order to separate the components from the vapor feed. More particularly, the present invention relates to such an apparatus and method in which the components are solidified within the cold traps. Even more particularly, the present invention relates to such an apparatus and method in which lower pressure cold traps are employed to vaporize solidified components at low pressure and higher pressure cold traps are used to vaporize resolidified components at a pressure higher than the vaporization pressure of the lower pressure cold traps.

There exist a variety of industrial processes that require mixed components to be recovered from a vapor stream. Such recovery is generally motivated by cost or environmental considerations. As an example, U.S. Pat. No. 5,502, 969 discloses a method of recovering expensive fluorine compounds that are used in semiconductor processing. In such method, an effluent containing the fluorine compounds and a wash liquid is introduced into a mass transfer contacting device such as a distillation column. The wash liquid washes the fluorine compounds out of the effluent. The resultant wash liquid containing the fluorine compounds is then fed into another distillation column to separate the fluorine compounds from the wash liquid. In EP 75 791 882, a cleaning gas such as nitrogen trifluoride is introduced into a chemical vapor deposition device to react with foreign materials such silicone dioxide, polysilicone, silicone nitrate, metasiliside and amorfisilicone. Not all of the nitrogen trifluoride reacts and the unreacted nitrogen trifluoride is recovered from an exhaust gas stream through liquefaction. U.S. Pat. No. 5,533,338 discloses a cryogenic vapor recovery process and system in which components contained within a vapor stream are recovered through condensation. The condensation is accomplished within heat exchangers operating out of phase so that one of the heat exchangers may be operated on-line to perform the recovery while the other heat exchanger is defrosted.

In any of the aforementioned patents, in order to store or utilize the recovered component at pressure, the component has to be compressed after recovery.

SUMMARY OF THE INVENTION

The present invention provides an apparatus for recovering at least one component from the vapor feed. The apparatus comprises at least a lower pressure cold trap and a higher pressure cold trap in communication with one another. In this regard, the terms "lower pressure" and "higher pressure" are meant herein and in the claims to differentiate the operational pressure of the cold-traps rather than to designate a particular operational pressure for each of the cold traps. As such the "lower pressure" cold trap operates at a lower pressure than the "higher pressure" cold trap. Each of the lower and higher pressure cold traps has on-line and defrost modes of operation to solidify and to vaporize at least one component. A feed flow circuit passes through the lower pressure cold trap for a passage of the vapor feed therethrough. The feed flow circuit is provided with a first set of isolation valves positioned to isolate the lower pressure cold trap within the feed flow circuit during vaporization of the at least one component. A recovery flow circuit communicates between the lower and higher pressure cold traps for passage of vapor, produced from vaporization of the at least one component, from the lower pressure to the higher pressure cold trap. Vapor passes when the lower pressure cold trap is in the defrost mode and the higher pressure cold trap is in the on line mode, thereby to resolidify the vapor in the higher pressure cold trap. A recovery flow circuit is provided with a second set of isolation valves positioned to isolate the higher pressure cold trap from the lower pressure cold trap during the defrost mode of operation of the higher pressure cold trap. This creates a vapor pressure therewithin and allows a subsequent flow of the at least one vaporized component therefrom under impetus of the vapor pressure.

In another aspect, the present invention provides a method of recovering at least one component from a vapor feed. The method comprises solidifying the at least one component within a lower pressure cold trap. Thereafter, the at least one component is vaporized within the lower pressure cold trap at a lower pressure. The at least one component is conducted, after having been vaporized to the higher pressure cold trap by resolidifying the at least one component within the higher pressure cold trap. The higher pressure cold trap is then isolated while vaporizing the at least one component in the higher pressure cold trap. This creates a vapor pressure within the higher pressure cold trap at a higher pressure than that obtained within the lower pressure cold trap and allows the subsequent flow of the at least one vaporized component from the higher pressure cold trap under impetus of the vapor pressure.

The utilization of the higher pressure cold trap, allows higher pressures to be created that are sufficient to allow delivery of one or more components to be separated from the vapor feed stream at a high delivery pressure, for instance, at a pressure necessary to fill storage tanks.

As will be discussed, the present invention can be used to advantage to separately concentrate components contained within a vapor feed to at least aid in recovery of the components.

BRIEF DESCRIPTION OF THE DRAWINGS

While the present invention concludes with claims distinctly pointing out the subject matter that applicants regard as their invention, it is believed that the invention will be better understood when taken in connection with the sole figure that is an apparatus for carrying out a process in accordance with the present invention.

DETAILED DESCRIPTION

Figure 1:
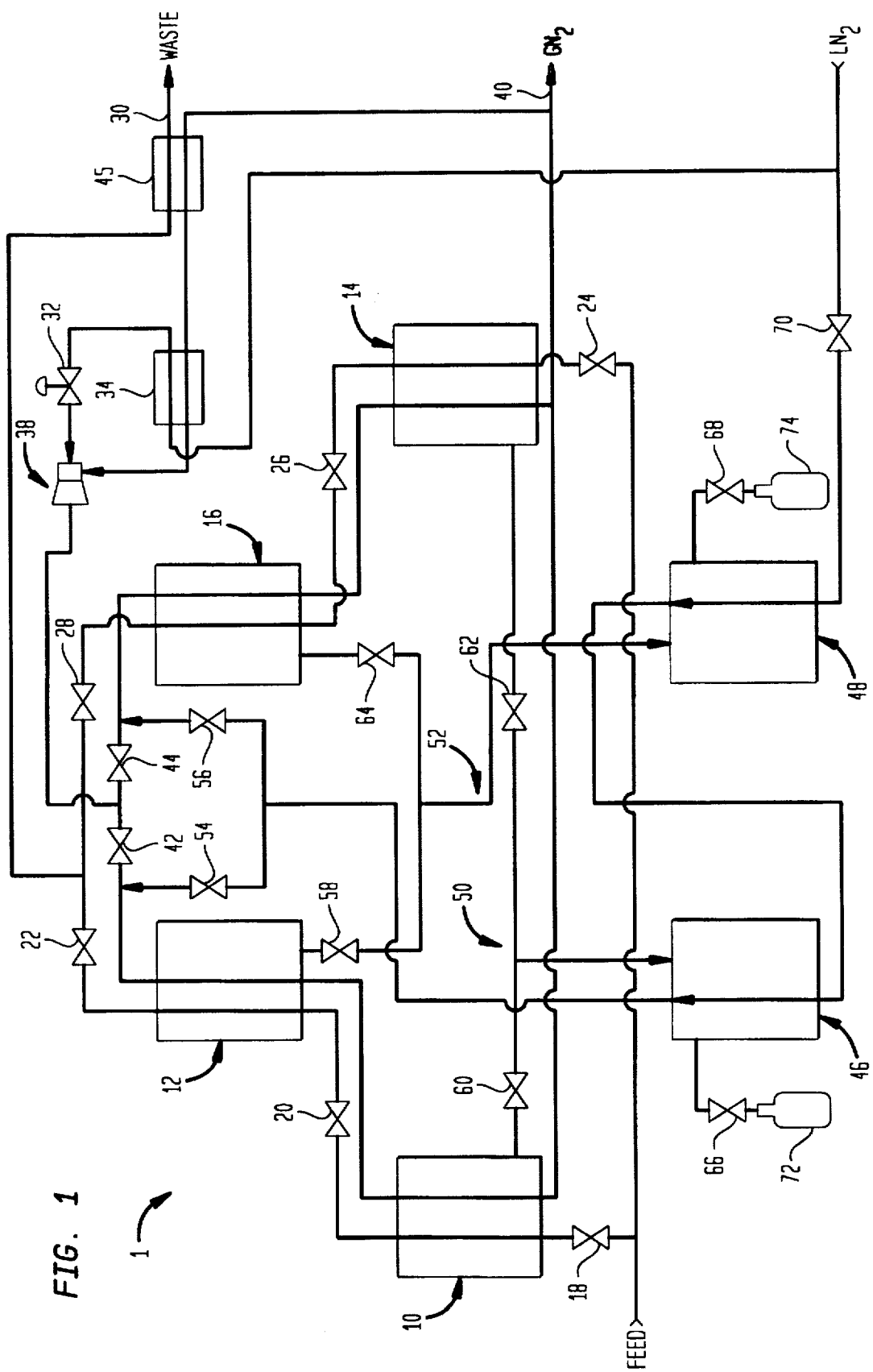

With reference to the figure, an apparatus 1 in accordance with the present invention is illustrated. Two sets of lower pressure cold traps 10, 12 and 14, 16, are provided for concentrating two components from the vapor feed. Cold traps 10 and 12 are designed to solidify the concentrates of the two components at a feed pressure which normally would be about atmospheric pressure. Feed passes through a feed flow circuit that conducts the vapor feed first through lower pressure cold trap 10 and then through lower pressure cold trap 12. The flow is controlled for such purpose by setting a first set of isolation valves 18, 20 and 22 in an open position and isolation valves 24, 26 and 28 in a closed position. When cold traps 10 and 12 are to be brought off line and defrosted, isolation valves 18, 20 and 22 are reset in the closed position and isolation valves 24, 26 and 28 are reset in the open position. This allows vapor feed to pass through lower pressure cold traps 14 and 16. After passage through the relevant set of lower pressure cold traps, the vapor feed is discharged from apparatus 1 via an exhaust 30.

The lower pressure cold traps 10, 12, 14 and 16 are heat exchangers that are designed to operate to concentrate by solidification of the two components to be separated from the vapor feed. The coolant used for such purpose is a cold cryogenic vapor, preferably, nitrogen. When valve 32 is set in an open position, liquid nitrogen flows through a heat exchanger 34 where it warms against re-cooling nitrogen vapor that has been used in recovery. The liquid after having had its enthalpy raised by such heat transfer acts as a motive fluid to ejector 38 which draws the re-cooled nitrogen vapor from the lower pressure cold traps 10, 12, 14, and 16. Excess nitrogen vapor is discharged through an exhaust 40.

The resultant cold nitrogen vapor produced by ejector 38 is then routed either to lower pressure cold trap 12 or lower pressure cold trap 16 depending upon whether a valve 42 or a valve 44 is set in an open position. The counter-current flow of cold nitrogen vapor concentrates the two components to be recovered on the lower pressure cold traps (10, 12 when valve 42 is set in an open position or 14,16 when valve 44 is set in an open position.) The resultant heated nitrogen vapor, along with nitrogen vapor from the defrost mode is recirculated back to economizing heat exchanger 45 for some recapture of the refrigeration imparted to the vapor feed prior its heat exchange with incoming liquid nitrogen.

Recovery of the concentrates is effectuated in two higher pressure cold traps 46 and 48 in which liquid nitrogen acts to re-solidify the concentrates of the two components. The concentrate predominantly containing the higher boiling component is conducted to higher pressure cold trap 46 from either lower pressure cold trap 10 or 14 through a recovery circuit 50. The concentrate predominately containing the lower boiling component is conducted from either lower pressure cold trap 12 or 16 to higher pressure cold trap 48 through a recovery circuit 52.

Liquid nitrogen vaporizes after passage through cold trap 48 and then cold trap 46. The vapor then either passes through lower pressure cold traps 12 and 10 or 16 and 14 depending upon whether valves 54 or 56 are set in the open position and acts to defrost the lower pressure cold traps and thereby to vaporize the concentrates predominately containing the higher and lower boiling components. Thus, when valve 54 is open, valve 42 is closed and lower pressure heat exchangers 12 and 10 are in an off-line mode of operation and are being defrosted. At the same time, valve 56 is closed and valve 44 is open and lower pressure cold traps 14 and 16 are in an on-line mode of operation freezing out the lower and higher boiling components within the vapor feed. After lower pressure cold traps 12 and 10 are defrosted, valve 56 can be opened, valve 54 can be closed, valve 42 can be opened, and valve 44 can be closed to bring lower pressure cold traps 12 and 10 on-line and lower pressure cold traps 16 and 14 off-line.

During defrost or vaporization of the higher and lower boiling components isolation valves 18, 20, and 22 are closed to isolate lower pressure cold traps 10 and 12 whereupon valves 58 and 60 are opened to allow the vaporized higher and lower boiling components to flow to higher pressure cold traps 46 and 48 through recovery circuits 50 and 52. Alternatively, isolation valves 24, 26, and 28 can be closed to isolate lower pressure cold traps 14 and 16 and valves 62 and 64 can be opened to allow for vapor flow from lower pressure cold traps 14 and 16. The flow of liquid nitrogen into higher pressure cold traps 46 and 48 re-solidifies the vapor and creates a low pressure to draw the vapor from lower pressure cold traps 10 through 16.

Once resolidified on higher pressure cold traps 46 and 48, valves 58 and 60 or valves 62 and 64 are set in the closed position along with outlet valves 66 and 68, located at the outlet of the higher pressure cold traps 46 and 48, and process control valve 70 to cut off the flow of liquid nitrogen. Ambient heat leakage causes the higher and lower boiling components to vaporize and build up a vapor pressure within higher pressure cold traps 46 and 48. After a sufficient vapor pressure has been built up, outlet valves 66 and 68 can be opened to allow filling of compressed gas cylinders 72 and 74.

By way of example, lower pressure cold traps 10, 12, 14, and 16 could be of spiral tube shell and tube heat exchangers. The vaporized feed would flow through the shell side while the cooling gas circulated through the tube side. In such example the cold traps 10, 12, 14, and 16 can be rated for a shell and tube side pressures of about 1000 kPa. The higher pressure cold traps 46 and 48 can be cryogenic high pressure vessels rated for about 4000 kPa. Each vessel would include tubing through which liquid or gaseous nitrogen coolant is allowed to circulate. Such construction could be used to concentrate perfluoroethane and carbon tetrafluoride from a vapor feed emanating from such semiconductor process tools as a chemical vapor deposition apparatus. As a calculated example, such feed typically contains about 42.8 kg/hr of perfluoroethane, about 5.6 kg/hr of carbon tetrafluoride, about 8.7 kg/hr of nitrogen and about 9.9 kg/hr of oxygen. Liquid nitrogen having a flow rate of about 400 kg/hr and a temperature of about 95K is introduced into higher pressure cold trap 48 where it is warmed to about 103K. The nitrogen further warms in higher pressure cold trap 46 to a temperature of about 119K and is introduced into lower pressure cold trap 12 where it exits at about 123K. The nitrogen next is introduced into lower pressure cold trap 10 and is discharged at about 155K. The nitrogen acts to thaw or vaporize a concentrate from the low temperature and lower pressure cold trap 12 containing about 2.1 0.9 kg/hr of perfluoroethane and about 5.6 kg/hr of carbon tetrafluoride. The concentrate from the higher temperature and lower pressure cold trap 10 contains perfluoroethane at a concentration of about 98%. The yield of perfluoroethane from higher pressure cold trap 46 is about 41.9 kg/hr of perfluoroethane and the yield from higher pressure cold trap 48 is about 0.75 kg/hr of perfluoroethane and about 4.1 kg/hr of carbon tetrafluoride. The product yeilds from both higher pressure cold traps 46 and 48 could be further purified by distillation for recovery of the perfluoroethane and disposal or recovery of the carbon tetrafluoride. At the same time, cold nitrogen gas is introduced into lower pressure cold trap 16 at a flow rate of about 133 kr/hr and a temperature of about 97K. The nitrogen gas warms to a temperature of about 178K within lower pressure cold trap 16 and then further warms to a temperature of about 215K upon discharge from lower pressure cold trap 14.

As can be understood, the present invention could be adapted to cover a single component within a vapor stream. In such case, it would be only one lower pressure cold trap and one higher pressure cold trap could be provided. In order to allow for a continuity of operation, two lower pressure cold traps could be provided. Moreover, although the invention has been exemplified with components that are concentrated, as would occur to those skilled in the art, in a proper case of component selection and concentration, outright separation between two components could be effectuated in apparatus 1.

While the present invention has been described with reference to preferred embodiment, as will occur to those skilled in the art, numerous changes, additions and omissions may be made without departing from the spirit and scope of the present invention.

We claim:

1. An apparatus for recovering at least one component from a vapor feed, said apparatus comprising:

at least a lower and a higher pressure cold trap in communication with one another and each having on-line and defrost modes of operation to solidify and vaporize said at least one component, respectively;

a feed flow circuit passing through said lower pressure cold trap for passage of said vapor feed therethrough and having a first set of isolation valves positioned to isolate said lower pressure cold trap within said feed flow circuit during vaporization of said at least one component; and a recovery flow circuit communicating between said lower pressure and higher pressure cold traps for passage of vapor, produced from vaporization of said at least one component, from said lower pressure to said higher pressure cold trap when said lower pressure cold trap is in the defrost mode and said higher pressure cold trap is in the on-line mode, thereby to re-solidify said vapor in said higher pressure cold trap;

said recovery flow circuit having a second set of isolation valves positioned to isolate said higher pressure cold trap from said lower pressure cold trap during the defrost mode of operation of said higher pressure cold trap, thereby to create a vapor pressure therewithin and to allow subsequent flow of said at least one vaporized component therefrom under impetus of said vapor pressure.

2. The apparatus of claim 1, wherein:

said vapor feed contains higher and lower boiling components;

there are two of said lower pressure cold traps and two of said higher pressure cold traps;

said feed flow circuit passes through said two lower pressure cold traps so that said two lower pressure cold traps are connected in series to solidify at least said higher boiling component within one of said two lower pressure cold trap and at least said lower boiling component within said other of said two lower pressure cold traps;

said recovery flow circuit has two legs respectively communicating between said two lower pressure and two higher pressure cold traps for passage of the higher and lower boiling components, after having been vaporized, from said two lower pressure to said two higher pressure cold traps, when said two lower pressure cold traps are in the defrost mode and said higher pressure cold traps are in the on-line mode, thereby to re-solidify said lower and higher boiling components in said two higher pressure cold traps, respectively; and said first set of isolation valves are also positioned to isolate each of said two lower pressure cold traps within said feed flow circuit during vaporization of said higher and lower boiling components; and said second set of isolation valves are positioned to isolate each of said two higher pressure cold traps from said two lower pressure cold traps during the defrost mode of operation of said higher pressure traps.

3. The apparatus of claim 1, further comprising a coolant flow circuit passing through said two higher and then said two lower cold traps so that coolant is introduced into said two higher pressure cold traps and then passes countercurrently to said feed vapor flow within said lower pressure cold traps.

4. The apparatus of claim 2, wherein:

two sets of said two lower pressure cold-traps are provided so that one of said two sets of two lower pressure cold-traps can be operated in the on-line mode of operation while the other is operated in the off-line mode of operation;

said recovery flow circuit has an additional two legs so that one set of two legs communicates between one of said two sets of two lower pressure cold traps to said two higher pressure cold traps and the additional two legs communicate between the other of said two lower pressure cold traps and said two higher pressure cold traps;

said feed flow circuit has two branches passing through said two sets of said two lower pressure cold traps; and said first set of isolation valves isolate each of said lower pressure cold-traps within the two branches of said feed flow circuit.

5. A method of recovering at least one component from a vapor feed, said apparatus comprising:

solidifying said at least one component within a lower pressure cold trap;

vaporizing said at least one component within said lower pressure cold-trap at a lower pressure;

conducting said at least one component, after having been vaporized, to said higher pressure cold trap by re-solidifying said at least one component within said higher pressure cold trap;

isolating said higher pressure cold trap while vaporizing said at least one component in said higher pressure cold trap, thereby to create a vapor pressure therewithin at a higher pressure than that obtained within the lower pressure cold trap and to allow subsequent flow of said at least one vaporized component therefrom under impetus of said vapor pressure.

6. The method of claim 5, wherein:

said vapor feed contains higher and lower boiling components;

said vapor feed is passed in sequence through two of said lower pressure cold traps operating at high and low temperatures, respectively, so that at least said higher boiling component is solidified in one of the two lower pressure cold traps and at least the lower boiling component is solidified in the other of the two lower pressure cold traps;

the higher and lower boiling components are vaporized, after having been solidified and resultant vapors are passed to two of said higher pressure cold traps and re-solidified therewithin; and said higher and lower boiling components are vaporized within said two of said higher pressure cold traps.

7. The method of claim 6, further comprising passing a coolant through said two higher and then said two lower cold traps so that coolant is introduced into said two higher pressure cold traps and then passes countercurrently to said feed vapor flow within said lower pressure cold traps.

8. The method of claim 6, further comprising operating two sets of said two lower pressure cold traps so that one of the two sets of said lower pressure cold traps are on-line while the other of the two sets of said lower pressure cold traps are in the defrost mode of operation and vice-versa.

* * * * *